United States Patent
Croak et al.

(10) Patent No.: US 7,593,343 B1
(45) Date of Patent: Sep. 22, 2009

(54) METHOD AND APPARATUS FOR MONITORING AND THE PREVENTION OF CALL STORMS IN A COMMUNICATIONS NETWORK

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 715 days.

(21) Appl. No.: 10/994,539

(22) Filed: Nov. 22, 2004

(51) Int. Cl.
*H04J 3/14* (2006.01)
*G06F 7/04* (2006.01)
*G06F 15/16* (2006.01)
*G06F 17/30* (2006.01)
*H04L 9/32* (2006.01)

(52) U.S. Cl. .......................... 370/241; 726/3
(58) Field of Classification Search ............... 370/241, 370/252; 726/3
See application file for complete search history.

(56) References Cited

U.S. PATENT DOCUMENTS

| | | | |
|---|---|---|---|
| 6,633,539 B1* | 10/2003 | Basso et al. | 370/229 |
| 7,380,010 B1* | 5/2008 | Oran | 709/227 |
| 7,389,354 B1* | 6/2008 | Sitaraman et al. | 709/229 |
| 2002/0133586 A1* | 9/2002 | Shanklin et al. | 709/224 |
| 2005/0052993 A1* | 3/2005 | Hanks et al. | 370/229 |

* cited by examiner

*Primary Examiner*—Kevin C Harper

(57) ABSTRACT

The present invention allows monitoring and the prevention of call storms in a communications network, e.g., a VoIP network. More specifically, the present invention enables a VoIP network to monitor the calling pattern, e.g., the number of calls within a period of time that occurs between the same endpoints. If the number of calls exceed a certain threshold, then these calls with the same endpoints will be terminated and an alarm notification will be sent, e.g., to a network operator.

6 Claims, 3 Drawing Sheets

METHOD AND APPARATUS FOR MONITORING AND THE PREVENTION OF CALL STORMS IN A COMMUNICATIONS NETWORK

The present invention relates generally to communication networks and, more particularly, to an apparatus and method for monitoring and prevention of call storms in a communications network, e.g., a Voice over Internet Protocol (VoIP) network.

BACKGROUND OF THE INVENTION

Under certain conditions, call setup signaling messages can sometimes loop within a communications network, e.g., a VoIP network and produce a call storm. During these call storms, an exceedingly high rate of calls to a single endpoint can be generated to cause other valid calls to be blocked. These call storms can be a result of misconfigured files in network based routing tables, human errors in duplicating call forwarding capabilities between two services to the same endpoint, or denial of service attacks.

Therefore, a need exists for a method and apparatus for providing monitoring and prevention call storms in a communications network, such as a VoIP network.

SUMMARY OF THE INVENTION

In one embodiment, the present invention allows monitoring and the prevention of call storms in a communications network, e.g., a VoIP network. More specifically, the present invention enables a VoIP network to monitor the calling pattern, such as the number of calls and the call rate within a period of time, the number of periods with certain sustained call rate, that occurs between the same endpoints. If the number of calls exceed a certain threshold, then these calls with the same endpoints will be terminated and an alarm notification will be sent, e.g., to a network operator.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
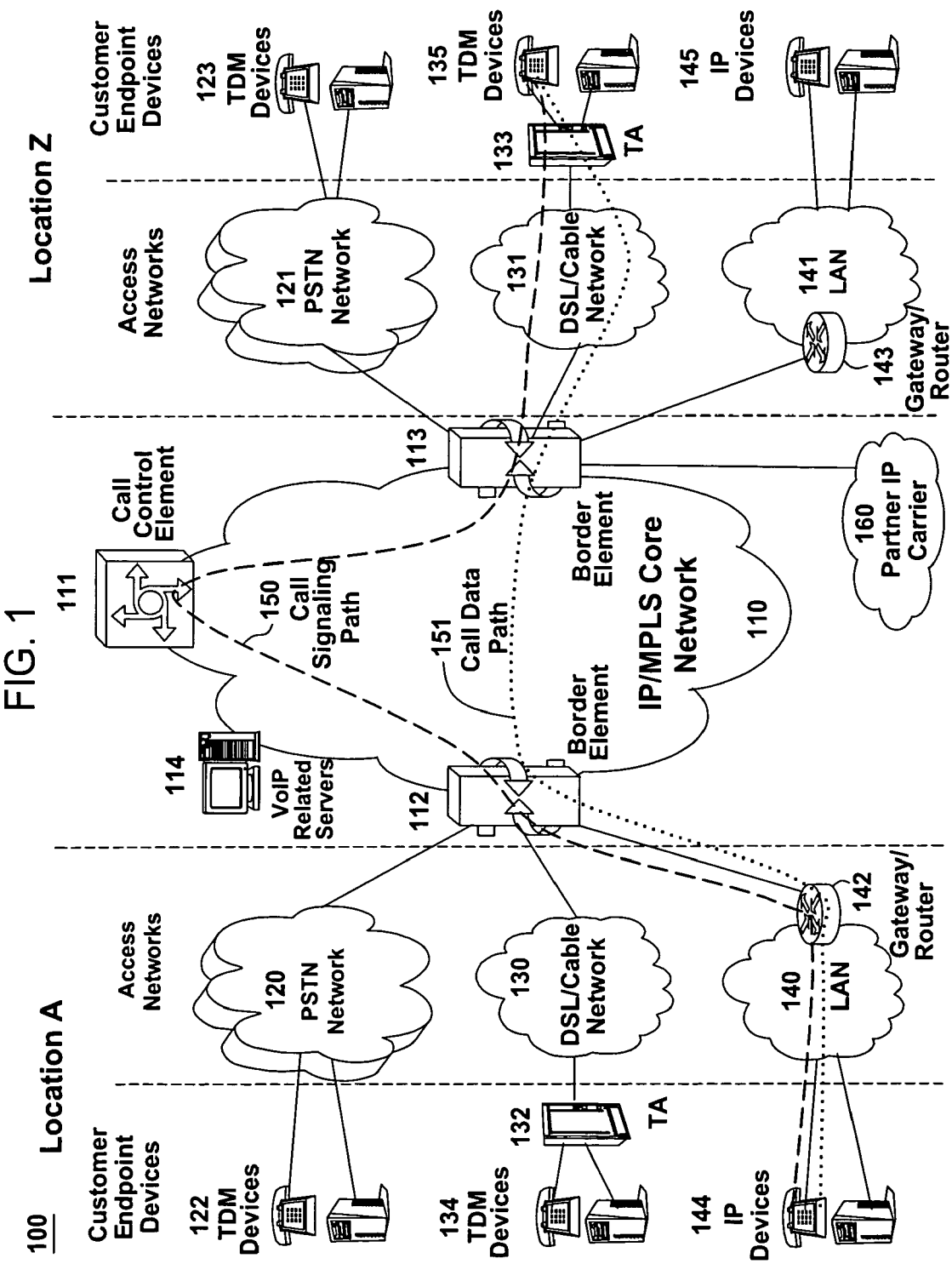
FIG. 1 illustrates a Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Under certain conditions, call setup messages can sometimes loop within a VoIP network and produce a call storm. During these call storms, the same call setup message or call setup messages with the same endpoints will loop within the network and will pass through the CCE multiple times for processing; therefore, the CCE will receive an exceedingly high call rate of calls to a single endpoint to cause other valid calls to be blocked. These call storms can be a result of misconfigured files in network based routing tables, human errors in duplicating call forwarding capabilities between two services to the same endpoint, or denial of service attacks. To address this criticality, the present invention provides a method and apparatus for monitoring and the prevention of call storms in a VoIP network.

Although the present invention is described in the context of SIP, It should be understood that the present invention can be employed in any signaling protocols. Furthermore, the present invention can be employed in signaling protocols that are compliant to various signaling standards or their variants.

Figure 2:
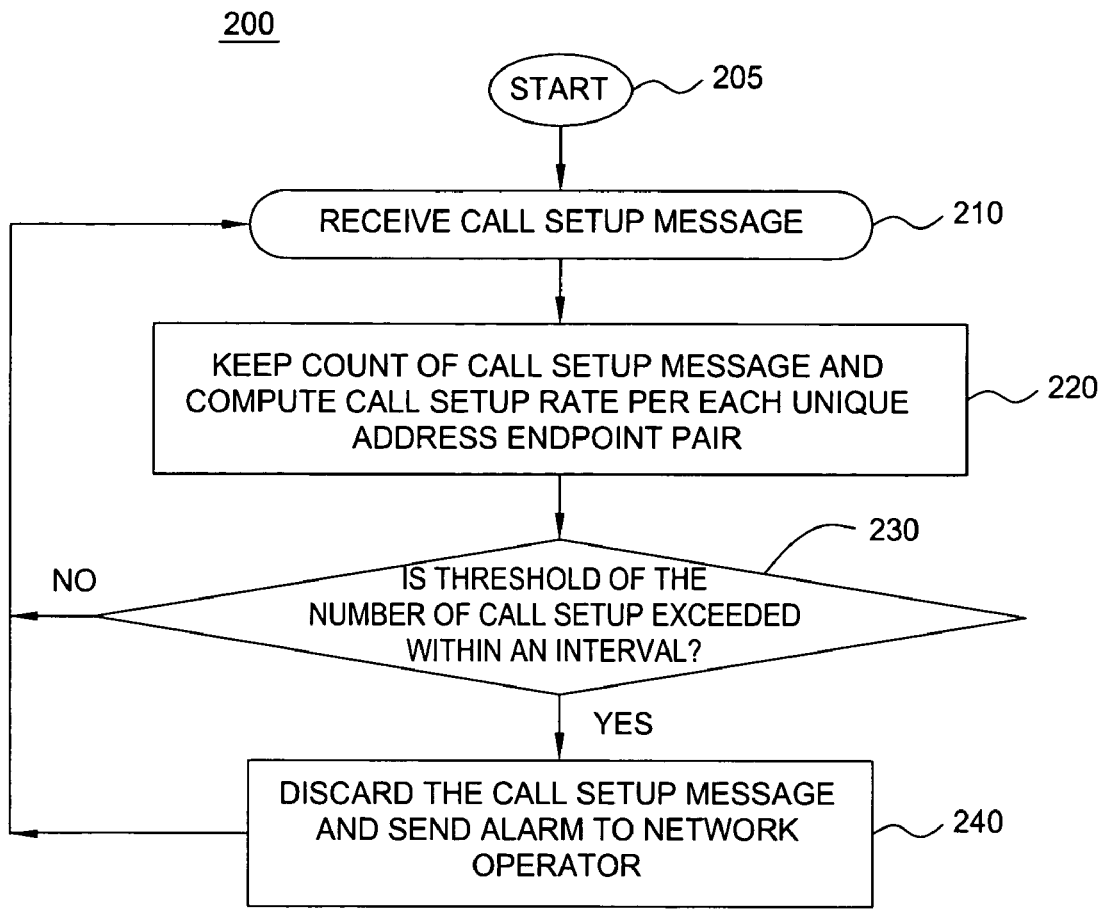
FIG. 2 illustrates a flowchart of a method for monitoring and prevention of call storms of the present invention.

FIG. 2 illustrates a flowchart of a call storm monitoring and prevention method 200 for monitoring call setup messages by the CCE of the present invention. The method 200 may run continuously within the CCE. Method 200 starts in step 205 and proceeds to step 210.

In step 210, the method 200 receives a call setup message, e.g., a Session Initiation Protocol (SIP) Invite message. In step 220, the method keeps count of the number of call setup messages per each unique address endpoint pair within each monitoring time interval specified by the network operator. Each monitoring time interval has a time duration. Using the count of the number of call setup messages and the time duration, the call setup rate can be computed by dividing the number of call setup messages per each unique address endpoint pair by the time duration, thereby generating the call setup rate for each monitoring time interval. Note that the call setup message count as well as the call setup rate between each unique address endpoint pair can be used to further identify predictable call setup patterns, such as a burst call pattern or an uneven call pattern, for those calls that exceed a discard threshold, as discussed below.

In step 230, the method checks if the call setup pattern per each unique address endpoint pair (e.g., between an endpoint at location A and an endpoint in location Z of FIG. 1) within each monitoring time interval has exceeded a preset discard threshold that is set by the network operator or a network requirement. If the discard threshold is exceeded, then the method proceeds to step 240; otherwise, the method proceeds back to step 210. Typically, the call setup rate caused by misconfigured files in network based routing tables can be in the range of 100 calls per minute. The call setup rate caused by denial of service attacks can even be as high as 50 calls per 5 second interval in a burst pattern. The call setup rate caused by human errors in configuring call forwarding capabilities between two services to the same endpoint can be as low as 5 calls per minute but such call setup rate may continue on for hours, e.g., for a large number of monitoring time intervals. Human errors in configuring call forwarding capabilities include the situation where a user sets a feature where user's work phone will forward all calls to a home phone, and then sets the same feature where the user's home phone will forward all calls to the user's work phone. This mistake can create a never ending loop that consumes the resources of a service provider.

In step 240, the method discards the call setup message between the address endpoint pair that exceeds the threshold pattern and sends an alarm to the network, e.g., the network operator to indicate such an error condition. Discarding the call setup message indicates that the call setup message will not be serviced, e.g., it will not be processed and/or forwarded. The method then proceeds back to step 210. It should be noted that the call setup patterns can also be stored for future analysis as well.

Thus, the present invention will allow the service provider to arbitrarily and dynamically set the discard threshold. For example, depending on the type of user, the service provider may set different discard thresholds, e.g., a higher threshold can be set for a business number versus a residential number. Alternatively, if it is determined that a denial of service is in progress, then the service provider can adjust the discard threshold accordingly for a number and then return the discard threshold to its original setting after the denial of service attack is over. In fact, the monitoring time interval can also be dynamically changed as well, e.g., shortening the monitoring time interval when a potential problem or attack is detected.

Figure 3:
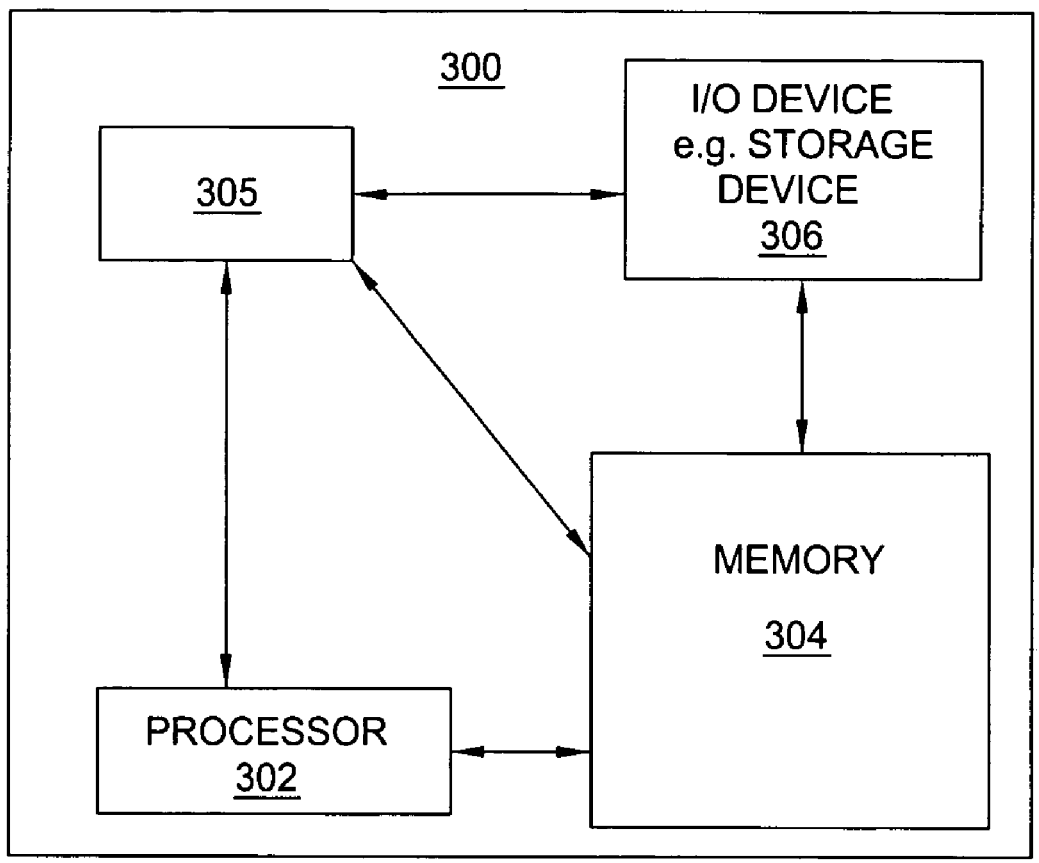
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), call setup message monitoring module 305, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present call setup message monitoring module 305 can be loaded into memory 304 and executed by processor 302 to implement the functions as discussed above. As such, the present single number to multiple devices process 305 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for monitoring call setup messages in a communications network, comprising:
   receiving a call setup message for setting up a call connection between a first endpoint and a second endpoint;
   calculating a call set up rate between said first endpoint and said second endpoint;
   determining whether said call setup rate between said first endpoint and said second endpoint has exceeded a discard threshold for a monitoring time interval, wherein said call setup rate is derived from a count of a number of call setup messages between said first endpoint and said second endpoint within a time duration of said monitoring time interval and wherein said monitoring time interval is selectively adjusted in response to a detected problem; and
   discarding said call setup message if said call setup rate between said first endpoint and said second endpoint has exceeded said discard threshold.

2. A method for monitoring call setup messages in a communications network, comprising:
   receiving a call setup message for setting up a call connection between a first endpoint and a second endpoint;
   calculating a call set up rate between said first endpoint and said second endpoint;
   determining whether said call setup rate between said first endpoint and said second endpoint has exceeded a discard threshold for a monitoring time interval, wherein said discard threshold is selectively adjusted in response to a detected problem; and
   discarding said call setup message if said call setup rate between said first endpoint and said second endpoint has exceeded said discard threshold.

3. A computer-readable medium having stored thereon a plurality of instructions, the plurality of instructions including instructions which, when executed by a processor, cause the processor to perform the steps of a method for monitoring call setup messages in a communications network, comprising:
   receiving a call setup message for setting up a call connection between a first endpoint and a second endpoint;
   calculating a call set up rate between said first endpoint and said second endpoint;
   determining whether said call setup rate between said first endpoint and said second endpoint has exceeded a discard threshold for a monitoring time interval, wherein said call setup rate is derived from a count of a number of call setup messages between said first endpoint and said second endpoint within a time duration of said monitoring time interval and wherein said monitoring time interval is selectively adjusted in response to a detected problem; and
   discarding said call setup message if said call setup rate between said first endpoint and said second endpoint has exceeded said discard threshold.

4. A computer-readable medium having stored thereon a plurality of instructions, the plurality of instructions including instructions which, when executed by a processor, cause the processor to perform the steps of a method for monitoring call setup messages in a communications network, comprising:
   receiving a call setup message for setting up a call connection between a first endpoint and a second endpoint;
   calculating a call set up rate between said first endpoint and said second endpoint;
   determining whether said call setup rate between said first endpoint and said second endpoint has exceeded a discard threshold for a monitoring time interval, wherein said discard threshold is selectively adjusted in response to a detected problem; and
   discarding said call setup message if said call setup rate between said first endpoint and said second endpoint has exceeded said discard threshold.

5. An apparatus for monitoring call setup messages in a communications network, comprising:
   means for receiving a call setup message for setting up a call connection between a first endpoint and a second endpoint;
   means for calculating a call set up rate between said first endpoint and said second endpoint;
   means for determining whether said call setup rate between said first endpoint and said second endpoint has exceeded a discard threshold for a monitoring time interval, wherein said call setup rate is derived from a count of a number of call setup messages between said first endpoint and said second endpoint within a time duration of said monitoring time interval and wherein said monitoring time interval is selectively adjusted in response to a detected problem; and
   means for discarding said call setup message if said call setup rate between said first endpoint and said second endpoint has exceeded said discard threshold.

6. An apparatus for monitoring call setup messages in a communications network, comprising:
   means for receiving a call setup message for setting up a call connection between a first endpoint and a second endpoint;
   means for calculating a call set up rate between said first endpoint and said second endpoint;
   means for determining whether said call setup rate between said first endpoint and said second endpoint has exceeded a discard threshold for a monitoring time interval, wherein said discard threshold is selectively adjusted in response to a detected problem; and
   means for discarding said call setup message if said call setup rate between said first endpoint and said second endpoint has exceeded said discard threshold.

* * * * *